A. W. ROWE.
TIRE FOR AUTOMOBILES, VEHICLES, OR THE LIKE.
APPLICATION FILED FEB. 8, 1911.
1,040,581.
Patented Oct. 8, 1912.
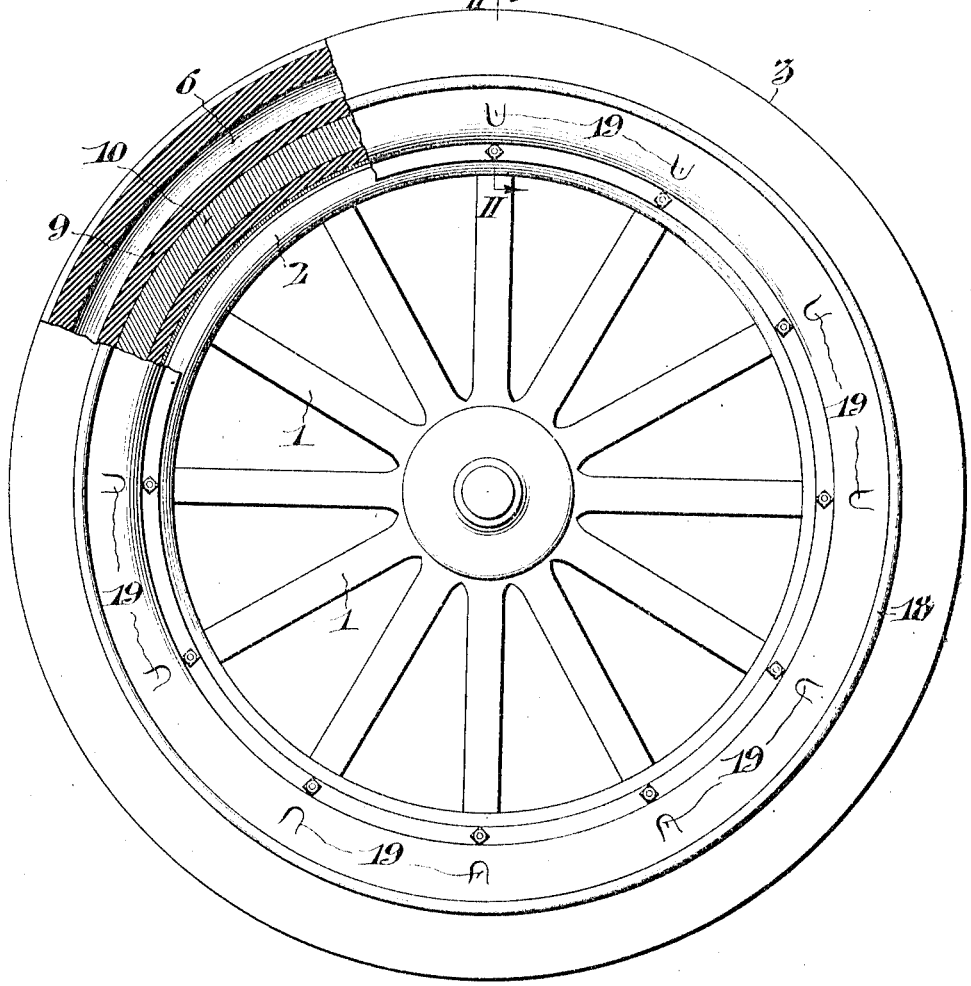
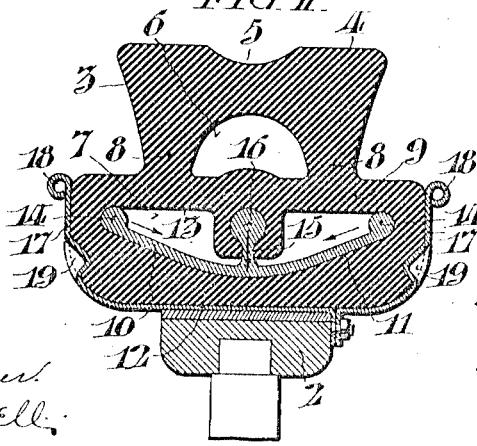
Witnesses
John C. Bergner
James H. Bell
Inventor
Addison W. Rowe,
By Macy & Paul
Attorneys

UNITED STATES PATENT OFFICE.

ADDISON W. ROWE, OF PHILADELPHIA, PENNSYLVANIA.

TIRE FOR AUTOMOBILES, VEHICLES, OR THE LIKE.

1,040,581.  Specification of Letters Patent.  Patented Oct. 8, 1912.

Application filed February 8, 1911.  Serial No. 607,289.

*To all whom it may concern:*

Be it known that I, ADDISON W. ROWE, of Philadelphia, in the county of Philadelphia and State of Pennsylvania, have invented certain new and useful improvements in tires for automobiles, vehicles, or the like, and more especially to non-inflated or cushioned tires used for this purpose, whereof the following is a specification, reference being had to the accompanying drawings.

An object of the invention is to provide a tire structure wherein the load pressure and resulting internal strains in the tire are carried entirely by a truss located within the tire and so disposed relative to the parts of the tire that the strain or pressure on the tread is conveyed in a radial direction through said truss to a supporting rim and centralized relative to the rim.

A further object of the invention is to provide a tire of the above character with a hollow chamber located between the truss and the tread, whereby the parts adjacent the tread may spread to afford a better contact with the surface on which the tread rolls so as to prevent to a certain extent skidding.

These and other objects will in part be obvious and will in part be hereinafter more fully described.

In the drawings which show by way of illustration one embodiment of the invention, Figure I, is a part side elevation and part vertical section through a wheel having my improved tire applied thereto. Fig. II, is a sectional view on the line II, II, in Fig. I.

In the drawings, I have shown a wheel 1, which may be of the ordinary construction, and is provided with a felly 2, on which is mounted the tire.

My improved tire 3, is of the cushion or non-inflated type, and consists of a tread surface 4, which is preferably curved centrally, as at 5. The entire tire 3, as herein shown is formed of rubber, which is shaped so as to provide two hollow chambers 6, and 7, which extend circumferentially about the tire. The chamber 6, is located between the chamber 7, and the tread 4, of the tire. The chamber 6, in the tire forms two spaced columns 8, 8, which receive the load pressure on the tread and conveys the same to the remaining portions of the tire. The portion of the tire 9, between the chamber 7, and the chamber 6, forms a span which receives the load pressure from the columns 8, 8. Located within the hollow chamber 7, is a truss 10, which, as herein shown, is formed of a single piece of metal which may be of sheet steel or which may be cast in the desired form. Said truss 10, extends circumferentially about the entire tire and has its lower face curved as shown in Fig. II. This curved surface of the truss in the present embodiment of my invention, engages or rests upon the inner wall 11, of the hollow chamber 7. Said truss is wider than the supporting rim 12, of the wheel, and extends from one side of the chamber 7, to the other side thereof. The outer side edges of the truss member 10, engage the outer wall 13, of the chamber 7, and, as herein shown said side edges are formed with a projecting rib 14, so as to form a smooth bearing surface for the outer wall. Centrally of the truss is a circumferential rib 15, which projects outwardly and as illustrated, is enlarged and curved so as to form a retaining bead 16. Projecting inwardly from the outer wall of the chamber 7, is a circumferential rib of rubber which is formed with a recess that conforms to and engages the bead 16, on the rib 15, of the truss.

The inner portion of the tire 3, which contains the chamber 7, is slightly wider than the portion of the tire containing the chamber 6, so that the columns 8, 8, are disposed over the spans 14, and centrally between the outer ribs 14, of the truss and the central rib 15. The load pressure on the tread will therefore be conveyed substantially in a radial direction through the rib 16, as indicated by the arrow in Fig. II, and through the curved members of the truss the strain or pressure will be directed toward the central portion of the rim, as indicated also by the arrows in this figure. It will, therefore, be seen that by my improved structure, the truss receives all the load pressure, that said pressure is centralized directly over the rim and to a great extent I have provided a self contained tire, that is a tire wherein the strains to which it is subjected are conveyed to the central portion of the rim, thus avoiding, to a great extent, the lateral strains on the tire and lateral strains on the supporting rim.

The tire as herein shown is supported by a rim 12, which may be made of sheet steel or cast or in any desired way. Said rim is formed with flanges 17, 17, which project outwardly and preferably to a point above the chamber 7, in the tire. The outer side edges of the rim are curved as at 18, to form a strengthening rib. In order to prevent the tire from creeping in the rim, I have provided indentations 19, which are spaced throughout the rim, and said indentations are embedded in the tire so as to hold the same from creeping on the tire. The rim may be made in two parts if desired, and bolted together in a suitable way, and any desired well known means may be used for securing the rim to the felly 2, of the wheel.

The chamber 6, in the tire structure will allow the parts adjacent the tread to spread under pressure and this spreading of these parts will through the structure in the tread cause a gripping of the tread on the surface on which said tread rolls, which will to a certain extent prevent skidding. The central projection in the outer wall of the chamber 7, which engages the central rib of the truss, will prevent any lateral slipping of said rib of the truss on said outer wall of the chamber and thereby aid in centralizing the pressure on the tire which is conveyed by the truss to the supporting rim and felly.

It is obvious that minor changes in the details of construction and the arrangement of the parts may be made without departing from the spirit of my invention, as set forth in the appended claims.

Having thus described my invention, I claim:

1. A tire comprising a rubber body portion having a chamber formed therein; a truss located in said chamber, said truss being curved transversely and having its outer edges rounded; a central rib projecting outwardly from said truss member, the wall in said chamber having an inwardly projecting rib engaging the rib on said truss whereby the load pressure on the truss is conveyed through said central rib and the outer portions of said truss to the central portion of the supporting rim.

2. A tire comprising a rubber body portion having a chamber formed therein; a truss located in said chamber, said truss being curved transversely and having its outer edges rounded; a central rib projecting outwardly from said truss member, the wall of said chamber having an inwardly projecting rib engaging the rib on said truss whereby the load pressure on the truss is conveyed through said central rib and the outer portions of said truss to the central portion of the supporting rim; and a second chamber located centrally of the tire and between said first named chamber and the tread of the tire.

3. The combination of a rim having outwardly projecting flanges; a tire located between said flanges; means for preventing the tire from creeping on the rim, said tire comprising a solid rubber portion having a chamber formed therein; a truss located within said chamber, said truss being curved transversely and having the outer curved surface thereof engaging the inner wall of said chamber, the outer edges of said truss engaging the outer wall of said chamber and engaging said rib on the truss, said tire having a second chamber formed therein between the first chamber and the tread of the tire, said second chamber forming columns in said tire which are located between the central rib and the outer edges of the truss.

In testimony whereof, I have hereunto signed my name at Philadelphia, Pennsylvania, this sixth day of February, 1911.

ADDISON W. ROWE.

Witnesses:
JAMES H. BELL,
E. L. FULLERTON.